INVENTORS
ERNEST L. KASTENBEIN
BY GERALD L. GELTMAN
*Arthur J. Plantamura*
ATTORNEY

United States Patent Office

3,700,597
Patented Oct. 24, 1972

3,700,597
DIELECTRIC COMPOSITIONS
Ernest L. Kastenbein, Rutherford, and Gerald L. Geltman, Wayne, N.J., assignors to Allied Chemical Corporation, New York, N.Y.
Filed Mar. 10, 1967, Ser. No. 622,242
Int. Cl. H01b 3/00, 3/02
U.S. Cl. 252—63.2
2 Claims

ABSTRACT OF THE DISCLOSURE

This specification discloses methods of preparing solid dielectric compositions containing boron nitride by admixing suitable boron nitride particles of high purity with suitable particles of a thermoplastic resin and fabricating a solid article from this mixture using heat and pressure. The unusual properties of boron nitride, particularly its low dielectric constant and anisotropic thermal conductivity, are utilized to advantage and the problem of severe power factor variation upon exposure of boron nitride articles to moisture has been eliminated. At high boron nitride concentrations, the relative particle size of boron nitride and resin particles was found to be critical in order to obtain high strength, solid articles.

---

Figure 1:
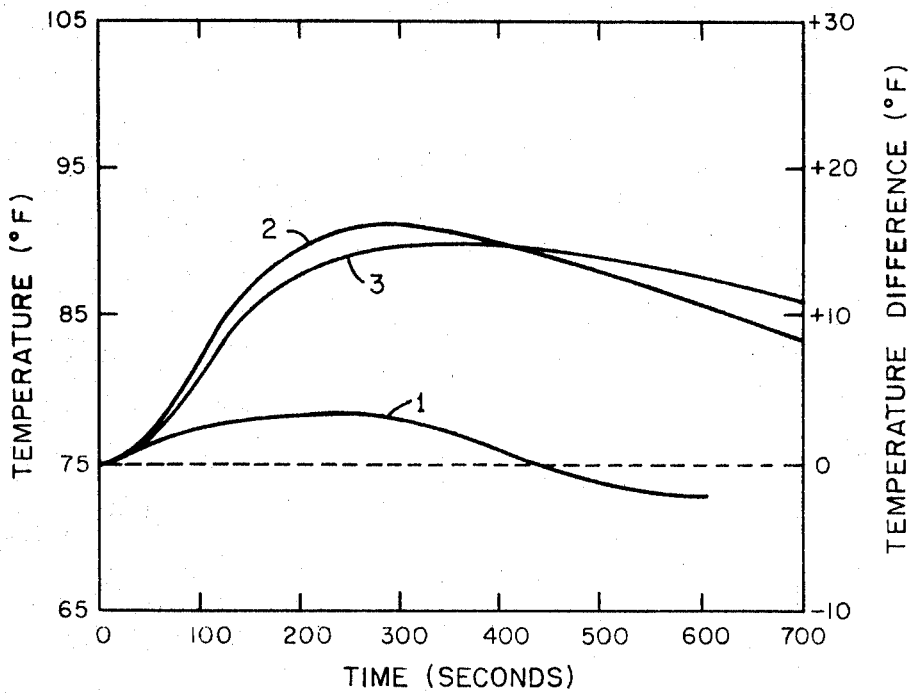

Boron nitride has an unusual combination of properties in that it is a non-conductor of electricity and is useful as an electrical insulator, and yet it is an excellent conductor of heat. Further, it is an anisotropic material, that is, it has a greater thermal conductivity in one direction than in another. This anisotropic behavior is due to the crystal structure of boron nitride, which is similar to that of graphite being hexagonal and forming platy type crystals. Boron nitride will conduct heat about 45 times more rapidly in the *a* crystallographic direction (parallel to the large dimensions of the plates) than in the *c* direction (perpendicular to the large dimensions of the plates). A material with this combination of properties is highly desirable for certain applications which require good electrical insulation capability and high heat transfer rates, such as for transistor bases, insulators for silicon-controlled rectifiers and mountings for thermally sensitive electrical components.

However, boron nitride has several drawbacks which have limited its usefulness until now. Pure boron nitride is difficult to fabricate into structurally sound articles. Boron nitride articles can be formed by deposition, that is, by vaporizing boron nitride at 3000° C. or higher and redepositing it on a shaped surface; this method is very costly due to the very high temperatures involved. Alternatively, boron nitride can be compacted using heat and pressures; this method is much simpler and less expensive, but boron nitride of a high purity, i.e. over 99% pure, although available in quantity commercially, cannot be compacted and about 3–5% of impurities, usually in the form of boron oxides, are needed to provide structurally sound shaped articles. The presence of these impurities contributes to the moisture sensitivity of boron nitride. Hot-pressed boron nitride is slightly water soluble and will absorb water and in fact has been used as a dessicant material. Its electrical properties vary markedly after exposure to moisture. For instance, the power factor, which is a measurement of the electrical energy absorbed by a material, is subject to very large variations upon exposure of hot-pressed boron nitride to moisture.

Thus, a low cost method of obtaining shaped articles of boron nitride which are moisture resistant has long been sought. These difficulties have now been overcome, and according to our invention, we can obtain oriented moisture-resistant structurally sound compositions containing high proportions of boron nitride by a simple inexpensive method of fabrication.

It is a principal object of this invention to provide solid boron nitride compositions which are resistant to the deleterious effects of moisture on its electrical properties.

It is another object to provide moisture-resistant boron nitride compositions which have anisotropic thermal conductivity.

It is a further object to provide a simple, inexpensive process for the preparation of structurally sound, moisture resistant, anisotropic compositions containing boron nitride.

Further objects will become apparent from the following detailed description thereof.

We have discovered that pure boron nitride can be formed into oriented, high strength, moisture-resistant compositions by admixing with about 25% by volume or more of a finely divided, thermoplastic polymer and applying moderate heat and pressure. The resultant compositions, solid at normal ambient temperatures, are excellent electrical insulators which have a greatly improved resistance to power factor variation due to the effects of moisture over that of hot-pressed boron nitride. In addition, the articles of the invention have not only a high thermal conductivity due to the boron nitride, but are oriented so that the anisotropic characteristics of boron nitride are retained. The thermoplastic retains employed in the invention should be susbtantially inert to moisture. A variety of readily available and easily fabricated solid polymers which are known to those skilled in the art and which are compatible with boron nitride may be utilized. Illustrative polymers include polyethylene, chlorinated polyethylene, polyvinyl chloride, polyvinylidene chloride, polyvinyl acetate, polyvinyl butyrate, polytetrafluoroethylene, polychlorotrifluoroethylene, cellulose triacetate, cellulose acetate butyrate, the acrylic resins such as polymethyl methacrylate, polystyrene, polycarbonate, polysulfone, polypropylene and the like. Additionally, for example, polyamides which are moisture resistant, such as those disclosed in U.S. Pat. 3,003,995 of E. C. Schule, issued Oct. 10, 1961, can also be employed. The relative particle size of the resin and the boron nitride crystals is critical. Structurally sound, high strength compositions will be obtained using high proportions of very pure boron nitride when the particle size of the resin is at least equal to, and preferably is smaller than, that of the boron nitride. The importance of particle size can be explained in that pure boron nitride particles cannot be compacted, even using elevated temperatures and high pressures. Thus, in order to form a structurally sound article, each boron nitride crystal should be surrounded by at least a thin coating of resin, which when fabricated under heat and pressure will bind the particles of boron nitride together and provide a solid article. The importance of relative particle size may vary somewhat depending on the relative proportion of boron nitride and resin employed. At comparatively high proportions of resin, it is likely that all of the boron nitride will be surrounded by resin and particle size is not so critical. However, at comparatively high proportions of boron nitride, if the resin particles are larger than the boron nitride particles, they will not coat the boron nitride particles completely and unbonded or weakly bonded sites will occur in the fabricated article. Thus, the polymer particles should be smaller than the boron nitride particles and course particles of boron nitride, on the order of at least about 40 microns should be employed. Particles of from about 75 to about 175 microns in size will be preferred when high levels, that is above about 50% by volume, of boron nitride content are desired.

In addition to boron nitride and resin, other compatible additives such as flexibilizers, diluents, stabilizers, antioxidants, pigments and the like, optionally, can also be incorporated into the resin in a manner known to those skilled in the art.

Conventional fabricating techniques and equipment which employ a combination of heat and pressure can be employed to form the shaped articles of the invention. After thoroughly admixing the boron nitride particles with the resin particles, by milling, grinding together, etc., the mixture can be fabricated as by compression molding, by molding followed by a sintering step, by extrusion and the like. The optimum temperatures and pressures employed will depend upon the resin used and are readily ascertainable as will be known to one skilled in the art. The pressure applied by these fabrication methods orients the plate-like boron nitride crystals so that their large dimension is in perpendicular alignment to the pressure applied and anisotropy of the boron nitride is maintained. Generally a temperature in the range of 100° C. to about 450° C. and a pressure of from about 5000 p.s.i. to about 10,000 p.s.i. includes the useful conditions.

The electrical properties of the compositions of the invention, such as dielectric constant and power factor, vary with varying proportions of resin and boron nitride. As the proportion of boron nitride increases, the dielectric constant increases and the power factor decreases. By proper choice of the polymer, dielectric, anisotropic compositions can be prepared having a wide variety of physical and electrical properties. As an example, when a very low loss material is desired, a high volume percent of boron nitride can be admixed with polyethylene, a particularly low loss dielectric material in itself, to prepare articles having a very low power factor, on the order of less than 0.0002.

The variation of power factor of the dielectric compositions of the invention upon exposure to moisture is on the order of 100 percent or less even for compositions containing very high proportions of boron nitride. On the other hand, hot-pressed boron nitride alone has power factor variations of many thousands percent.

Figure 2:
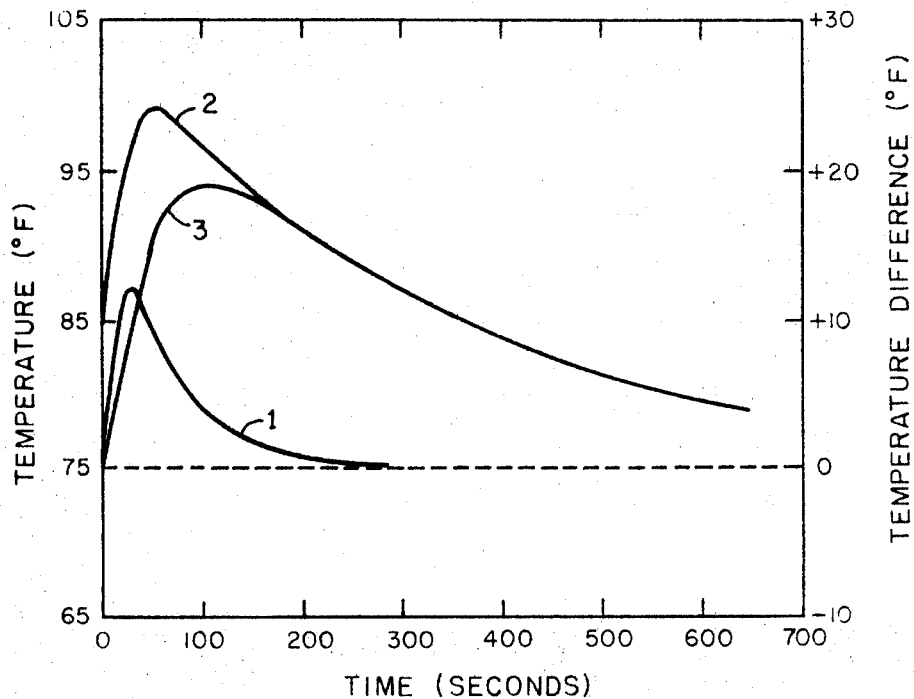

The boron nitride-thermoplastic polymer bonded compositions of the invention, as noted hereinabove, are also thermally conductive and anisotropic; these are characteristics which are lacking in polymers generally in the absence of boron nitride. The accompanying drawings demonstrate the relative thermal diffusivity of a polymethyl methacrylate resin alone as shown in FIG. 1 and a polymethyl methacrylate-bonded boron nitride composition prepared in accordance with our invention, as shown in FIG. 2. In collecting the data, a heated brass slug was inserted into a cavity in the center of the article fabricated by molding the resin or boron nitride-resin composition into a cylindrical article. The junctions of a differential thermocouple were placed in two holes drilled into the article for that purpose; one junction in parallel alignment and the other in perpendicular alignment with the pressure applied in fabricating the article. The E.M.F. produced by the thermocouple due to variations in the thermal diffusivity in the article versus time was recorded on a strip chart to produce the curves shown in FIGS. 1 and 2.

FIG. 1 shows graphically the changes in temperature versus time in the direction perpendicular to the fabricating pressure applied (curve 2); in the direction parallel to the fabricating pressure applied (curve 3); and the difference between these temperature changes (curve 1) for the polymethyl methacrylate article.

FIG. 2 shows graphically the changes in temperature versus time in the direction perpendicular to the fabricating pressure applied (curve 2); in the direction parallel to the fabricating pressure applied (curve 3); and the difference between these temperature changes (curve 1) for the polymethyl methacrylate-bonded boron nitride article.

A comparison of the data obtained in FIG. 1 and FIG. 2 shows that heat was transmitted through the resin-bonded boron nitride article substantially more rapidly than the resin article without the boron nitride. Also, heat was transmitted more rapidly in the direction perpendicular to the fabricating pressure applied than in the parallel direction for the resin-bonded boron nitride article.

The compositions of the invention are useful as electrical insulators, mounting for electronic components, especially where it is desirable to dissipate heat rapidly, transistor bases and insulators for silicon controlled rectifiers. The boron nitride-thermoplastic resin-bonded compositions of the invention are also useful for self lubricating bearings, and for chemically resistant heat exchangers. They can be machined easily after fabricating if required for precision tolerances. The compositions of the invention are also useful as ablative-type heat shields.

The following examples are given to further illustrate the invention but it is to be understood that the invention is not meant to be limited to the details therein.

EXAMPLE 1

A series of polymer and boron nitride mixtures were prepared by admixing the polymers with 99.5% pure boron nitride powder [1] in a Paterson-Kelly Twin Shell Blender. Sufficient quantities of the mixtures were charged into 1¼" diameter steel molds to produce 1/16" thick pieces and compacted at 140° C. and 7500 p.s.i. Two grades of boron nitride were used; a fine grade, having a particle size of from 1 to 40 microns and average size of 4 microns, and a coarse grade, specified as being at least 75% between 75 and 175 microns.

As can be seen from the data given in the Table I below, the dielectric constant increases and power factor decreases with increasing proportions of boron nitride. These electrical determinations were made with a Boonton 260A Q-meter using unguarded foil electrodes extending to the edge of the molded specimens.

TABLE I

| Resin | Dielectric constant | Power factor |
|---|---|---|
| Percent by volume boron nitride: | | |
| 0 — Methyl methacrylate [1] | 2.95 | 0.019 |
| 10 — Methyl methacrylate [1] | 3.06 | 0.017 |
| 25 — Methyl methacrylate [1] | 3.14 | 0.013 |
| 50 — Methyl methacrylate [1] | 3.46 | 0.009 |
| 0 — Polyethylene [2] | 2.51 | 0.00067 |
| 25 — Polyethylene [2] | 2.88 | 0.00056 |
| 50 — Polyethylene [2] | 3.55 | 0.00030 |
| 75 — Polyethylene [2] | 3.73 | 0.00018 |
| 0 — Polychlorotrifluoroethylene [3] | 2.33 | 0.011 |
| 40 — Polychlorotrifluoroethylene [3] | 2.94 | 0.0069 |
| 50 — Polychlorotrifluoroethylene [3] | 2.94 | 0.0057 |

[1] 67% between 149-74 microns.
[2] 80% between 149-55 microns.
[3] 100% finer than 149 microns.

Microscopic and X-ray diffraction studies were carried out on specimens containing 50% and 75% by volume of coarse boron nitride. These studies confirmed that a preferred orientation of the boron nitride crystals occurs during forming.

EXAMPLE 2

Various mixtures of a moisture-resistant boron nitride and polymethyl methacrylate were prepared and molded according to the procedure given in Example 1. The molded samples were measured for dielectric constant and power factor and then exposed to air of a controlled humidity. Results taken after exposure are given below, with the percentage change noted in Table II.

In the table, Grade Y represents a boron nitride comprising more than 75% between 75 and 177 microns in ---
[1] Obtained from Carbon Products Division, Union Carbide Corporation and the Electronics Division, Carborundum Company.

size and Grade Z comprises boron nitride having particle size between 1 and 40 microns.

TABLE II

| Boron nitride | | Dry | | | After exposure, 62% RH | | Increase in power factor |
|---|---|---|---|---|---|---|---|
| Percent by volume | Grade | Power factor | Dielectric constant | Days | Power factor | Dielectric constant | |
| 100 | Hot-pressed | 0.000084 | 4.40 | 4 | 0.0133 | 4.17 | 15,733 |
| | | 0.000092 | 4.41 | 9 | 0.0120 | 4.40 | 12,944 |
| 75 | Y | 0.0040 | 3.41 | 2 | 0.0058 | 3.42 | [1] 45 |
| 50 | Y | 0.0092 | 3.47 | 7 | 0.0116 | 3.47 | [1] 26.1 |
| 10 | Z | 0.0170 | 3.08 | 2 | 0.0183 | 3.03 | [1] 7.6 |
| | | | | | 93% RH | | |
| 75 | Y | 0.0040 | 3.41 | 8 | 0.0071 | 3.40 | [1] 77.5 |
| 10 | Z | 0.0170 | 3.08 | 8 | 0.0207 | 3.00 | [1] 21.8 |

[1] Percent change.

Various modifications of the invention will be apparent to one skilled in the art. Accordingly, the invention is not to be limited by the details disclosed herein which have been presented primarily as an aid in better understanding the invention.

We claim:

1. A process of fabricating oriented boron nitride compositions which have a power factor variation upon exposure to moisture of less than 100% which comprises admixing boron nitride particles of at least 99% purity with from about 25 to about 50% by volume based on the total volume of smaller particles of a moisture resistant thermoplastic polymer and forming the resultant mixture at temperatures from the melting point of the polymer up to 450° C. and pressures of from 5,000 to about 10,000 p.s.i.

2. A process according to claim 1 wherein said boron nitride particles are between about 75 and about 175 microns in size.

References Cited

UNITED STATES PATENTS

| | | | |
|---|---|---|---|
| 2,748,030 | 5/1956 | Silversher et al. | 117—132 BS |
| 2,806,109 | 9/1957 | Sterling | 260—38 X |
| 2,871,216 | 1/1959 | Anderson, Jr. | 260—41.5 |
| 2,971,908 | 2/1961 | Chaffin | 252—12 |
| 3,050,490 | 8/1962 | Nitzche et al. | 260—37 |
| 3,261,800 | 7/1966 | Collins | 260—37 |

FOREIGN PATENTS 998,637  7/1965  Great Britain.

JOHN D. WELSH, Primary Examiner

U.S. Cl. X.R.

252—63.5, 64; 260—37, 41; 264—111; 317—258